(12) United States Patent
Andersson et al.

(10) Patent No.: US 12,053,933 B2
(45) Date of Patent: Aug. 6, 2024

(54) INDUCTION SEALING DEVICE

(71) Applicant: TETRA LAVAL HOLDINGS & FINANCE S.A., Pully (CH)

(72) Inventors: Håkan Andersson, Åkarp (SE); Andrea Babini, Modena (IT); Gloria Guidetti, Bologna (IT); Richard Sandberg, Södra Sandby (SE)

(73) Assignee: TETRA LAVAL HOLDINGS & FINANCE S.A., Pully (CH)

( * ) Notice: Subject to any disclaimer, the term of this patent is extended or adjusted under 35 U.S.C. 154(b) by 0 days.

(21) Appl. No.: 18/250,229

(22) PCT Filed: Nov. 2, 2021

(86) PCT No.: PCT/EP2021/080325
§ 371 (c)(1),
(2) Date: Apr. 24, 2023

(87) PCT Pub. No.: WO2022/096428
PCT Pub. Date: May 12, 2022

(65) Prior Publication Data
US 2023/0391018 A1 Dec. 7, 2023

(30) Foreign Application Priority Data
Nov. 6, 2020 (EP) .................................... 20206208

(51) Int. Cl.
*B29C 65/36* (2006.01)
*B65B 51/22* (2006.01)

(52) U.S. Cl.
CPC ...... *B29C 65/3656* (2013.01); *B29C 65/3668* (2013.01); *B29C 65/368* (2013.01);
(Continued)

(58) Field of Classification Search
CPC .. B29C 65/36–3696; B29K 2995/0007; B29K 2995/0008; B65B 51/227
(Continued)

(56) References Cited

U.S. PATENT DOCUMENTS 7,490,449 B1\* 2/2009 Eibert .................. B29C 65/1467
53/553
10,307,966 B2\* 6/2019 Alexandersson ... B29C 66/3472
(Continued)

FOREIGN PATENT DOCUMENTS

CN 107000328 A 8/2017
CN 208165405 U 11/2018
(Continued)

OTHER PUBLICATIONS

International Search Report (PCT/ISA/210) and Written Opinion (PCT/ISA/237) mailed on Dec. 22, 2021 by the European Patent Office as the International Searching Authority for International Application No. PCT/EP2021/080325. (9 pages).
(Continued)

*Primary Examiner* — Joshua G Kotis
(74) *Attorney, Agent, or Firm* — BUCHANAN INGERSOLL & ROONEY PC (57) ABSTRACT

An induction sealing device for heat sealing packaging material for producing sealed packages of pourable food products, the sealing device comprising: an inductor configured to induce a current in the packaging material, the inductor comprising conductor elements; a polymer insert holding the conductor elements; and a supporting body holding the polymer insert; wherein the polymer insert comprises a polymer matrix into which graphene particles are dispersed.

22 Claims, 6 Drawing Sheets

(52) U.S. Cl.
CPC .... *B65B 51/227* (2013.01); *B29K 2995/0007* (2013.01); *B29K 2995/0008* (2013.01)

(58) Field of Classification Search
USPC ........ 53/DIG. 2, 477, 373.7, 373.8; 219/604
See application file for complete search history.

(56) References Cited

U.S. PATENT DOCUMENTS

| | | | | |
|---|---|---|---|---|
| 11,534,985 | B2* | 12/2022 | Palmquist | B29C 66/81422 |
| 11,633,814 | B2* | 4/2023 | Barhorst | B23K 35/368 |
| | | | | 219/148 |
| 11,654,651 | B2* | 5/2023 | Ito | B32B 7/06 |
| | | | | 219/203 |
| 2004/0182046 | A1 | 9/2004 | Babini et al. | |
| 2012/0080418 | A1* | 4/2012 | Sakamoto | B29C 66/91443 |
| | | | | 219/243 |
| 2013/0251425 | A1* | 9/2013 | Son | H05B 3/146 |
| | | | | 219/544 |
| 2017/0120506 | A1* | 5/2017 | Bierlein | B65B 51/30 |
| 2017/0274582 | A1 | 9/2017 | Karlsson et al. | |
| 2017/0305586 | A1* | 10/2017 | Rizzi | B29C 66/232 |
| 2021/0274603 | A1* | 9/2021 | Jang | H05B 6/04 |

FOREIGN PATENT DOCUMENTS

| | | |
|---|---|---|
| CN | 109070487 A | 12/2018 |
| EP | 1270182 A1 | 1/2003 |
| EP | 2008795 A1 | 12/2008 |
| EP | 3431267 A1 | 1/2019 |
| EP | 3 663 076 A1 | 6/2020 |
| WO | WO-2019180292 A1 * | 9/2019 ............. B32B 9/007 |

OTHER PUBLICATIONS

U.S. Appl. No. 18/251,788, filed May 4, 2023, Håkan Andersson et al.

* cited by examiner

INDUCTION SEALING DEVICE

TECHNICAL FIELD

The present invention relates, in general, to an induction sealing device.

BACKGROUND

Many pourable food products, such as fruit juice, UHT milk, wine, tomato sauce, etc., are sold in packages made of sterilized packaging material. A typical example of this type of packages is the parallelepiped-shaped package for liquid or pourable food products known as Tetra Brik Aseptic (registered trademark), which is made by folding and sealing laminated strip packaging material.

The packaging material has a multilayer structure substantially comprising a base layer for stiffness and strength, which may comprise a layer of fibrous material, e.g. paper, or mineral-filled polypropylene material; and a number of layers of heat-seal plastic material, e.g. polyethylene films, covering both sides of the base layer.

In the case of aseptic packages for long-storage products, such as UHT milk, the packaging material also comprises a layer of gas- and light-barrier material, e.g. aluminium foil or ethyl vinyl alcohol (EVOH) film, which is superimposed on a layer of heat-seal plastic material, and is in turn covered with another layer of heat-seal plastic material forming the inner face of the package eventually contacting the food product.

As is known, packages of this sort are produced on fully automatic packaging units, on which a continuous tube is formed from the web-fed packaging material; the web of packaging material is sterilized on the packaging unit, e.g. by applying a chemical sterilizing agent, such as a hydrogen peroxide solution, which, once sterilization is completed, is removed from the surfaces of the packaging material, e.g. evaporated by heating; and the web of packaging material so sterilized is maintained in a closed, sterile environment, and is folded and sealed longitudinally to form a vertical tube.

The tube is fed continuously in a first vertical direction, is filled with the sterilized or sterile-processed food product, and is gripped at equally spaced cross sections by two pairs of jaws. More specifically, the two pairs of jaws act cyclically and successively on the tube, and heat seal the packaging material of the tube to form a continuous strip of pillow packs connected to one another by respective transverse sealing bands, i.e. extending in a second direction perpendicular to said first direction.

The pillow packs are separated by cutting the relative transverse sealing bands, and are then fed to a final folding station where they are folded mechanically into the finished parallelepiped shape.

The tube portion gripped between each pair of jaws is heat sealed by heating means fitted to one of the jaws, known as the sealing jaw, and which locally melt the two layers of heat-seal plastic material gripped between the jaws.

More specifically, packaging material in which the layer of barrier material comprises a sheet of electrically conductive material, e.g. aluminium, is normally heat sealed by a so-called induction heat-sealing process when the tube is gripped by a jaw. In the induction heat-sealing process an induction sealing device induces an eddy current in the aluminum sheet to heat the aluminum sheet locally, thereby locally melting the heat-seal plastic material.

More specifically, in an induction sealing device, the heating means substantially comprises an inductor powered by a high-frequency current generator. The inductor herein substantially comprising one or more conductor elements made of electrically conductive material which interact with the tube material to induce an eddy current in it and heat it to the necessary sealing temperature.

Sealing devices comprising inductors of the above type are known, e.g. from the patent documents EP 1 270 182 and EP 2 008 795.

More specifically, known sealing devices may comprise a supporting body connected integrally to the sealing jaw and defining two front seats for housing respective inductors; and an insert made of magnetic flux-concentrating material—in particular, a composite material comprising ferrite—and housed inside the supporting body, close to the conductor elements.

More specifically, the supporting body cooperates with the insert, and defines a peripheral portion of the sealing device surrounding the conductor elements and the insert of magnetic flux-concentrating material.

Although present induction sealing devices have many advantages, there is still room for improvement in terms of e.g. durability, cost-efficiency and sealing speed.

SUMMARY

It is an objective of the invention to provide a durable induction sealing device. It is a further objective of the invention to provide a cost-effective induction sealing device. It is a further objective of the invention to facilitate a high sealing speed of the induction sealing device.

These and other objectives of the invention are at least partly met by the invention as defined in the independent claims. Preferred embodiments are set out in the dependent claims.

According to a first aspect of the invention, there is provided an induction sealing device for heat sealing packaging material for producing sealed packages of pourable food products, said sealing device comprising:

an inductor configured to induce a current in the packaging material, the inductor comprising conductor elements;
    a polymer insert holding said conductor elements; and
    a supporting body holding said polymer insert;
    wherein the polymer insert comprises a polymer matrix into which graphene particles are dispersed.

The inventors have realized that efficient thermal management of induction sealing devices has several advantages.

Firstly, efficient thermal management enables durable and cost-effective induction sealing devices. In particular, the inductor of an inductor sealing device may be damaged by high temperatures and require maintenance and/or replacement. When an inductor breaks or reaches the end of its predicted lifetime the entire supporting body with its polymer insert and inductor may need to be replaced. As an entire production line, or parts of a production line, for packaging may rely on an induction sealing device, maintenance of said induction sealing device may be associated with great costs. Thus, effective cooling of the inductor, and/or parts in the vicinity of the inductor, may improve the durability of the induction sealing device and thereby reduce costs related to maintenance interruptions in the production process and costs related to spare parts.

Secondly, efficient thermal management enables a high sealing speed. During the sealing, the inductor may be turned on to induce an eddy current in the electrically conductive material of the packaging material such that it is heated to the sealing temperature, whereby the heat-seal plastic material at least partially melts. Subsequently, the inductor may be turned off, whereby the heat-seal plastic material may solidify, e.g. solidify while being gripped by the sealing jaws. Thus, effective cooling of the inductor, and/or parts in the vicinity of the inductor, may reduce the time required for solidifying the heat-seal plastic material. The quicker the heat-seal plastic material solidifies, the quicker the sealing jaws may release the packaging material. Consequently, efficient thermal management enables a high sealing speed.

The inventors have realized that efficient thermal management of an induction sealing device may be facilitated by dispersing graphene particles in the polymer insert. The polymer insert holds the conductor elements of the inductor while the supporting body holds the polymer insert. By dispersing graphene particles in polymer matrix of the polymer insert, the thermal conductivity of the polymer insert may increase. Thereby, the polymer insert may conduct heat away from the inductor, e.g. to the supporting body, such that the inductor is efficiently cooled. Further, the polymer insert may conduct heat away from the heat-seal plastic material, e.g. to the supporting body, such that the heat-seal plastic material is efficiently cooled.

The reason for the increase in thermal conductivity of the polymer insert may be the high thermal conductivity of graphene, around 1000-5000 $Wm^{-1} K^{-1}$ for single layer graphene. The thermal conductivity of a polymer insert comprising graphene may be lower. Still, a substantial improvement in the thermal conductivity of the polymer insert may be seen when graphene is added to the polymer matrix.

The inventors have realized that even though graphene has a high electron mobility, the conductor elements may not short circuit due to the dispersion of graphene in the polymer matrix of the polymer insert. Thus, even though the high electron mobility may appear problematic, tests have shown that the performance of induction sealing devices may improve when graphene is dispersed in the polymer matrix of the polymer insert.

The inventors have realized that great care must be taken when choosing particles to be dispersed in the polymer matrix in order to reduce the defect rate in the production process. The polymer insert is often produced by casting the melted polymer in a mould. For example, casting the melted polymer matrix in a recess in the supporting body. If the melted polymer does not fill the mould entirely the produced polymer insert may be defective and need to be discarded. Further, during the casting there may be a segregation of fillers added to the polymer matrix which may result in some induction sealing devices being defective and needing to be discarded. It is a realization that the production defect rate may be low when graphene is used, which may save costs. The reason for the low production defect rate may be that the dispersion of graphene in the polymer matrix of the polymer insert does not reduce the melt flow rate of the melted polymer matrix substantially. Thereby the melted polymer matrix may fill the mould easily. Another reason for the low production defect rate may be that the dispersion of graphene in the polymer matrix of the polymer insert does not result in a substantial segregation of graphene. Thus the graphene may be evenly distributed within the polymer insert.

Further, graphene may exhibit good mechanical properties. For example, graphene may have a mechanical strength around 100-1100 GPa and a Young's modulus around 1 TPa. Thus, the mechanical properties of the polymer insert may not degrade due to the dispersion of graphene in the polymer matrix of the polymer insert. A durable polymer insert with good mechanical properties may be important as wear may be high when the packaging unit repeatedly grips and releases the packaging material. Thus, not degrading the mechanical properties of the polymer insert may be important to reduce maintenance associated with damaged polymer inserts. This may in turn lead to cost savings.

The inductor comprises conductor elements which may form parts of an inductor loop. An inductor loop may also be called a wire loop. A conductor element may be an electrically conductive wire or an electrically conductive bar. The inductor may comprise e.g. one or two inductor loops. Thus, the inductor may be a single loop inductor or a double loop inductor. Of course, the inductor may comprise more than two loops.

The inductor may be configured to be connected to an alternating current generator, e.g. a high-frequency current generator. The inductor may be configured such that an alternating current in the inductor, e.g. in the loops of the inductor, induces an alternating magnetic field. The alternating magnetic field may, in turn, induce a current, e.g. an eddy current, in the packaging, e.g. in an aluminum foil of the packaging.

The polymer insert may be configured to hold the conductor elements in various ways. The polymer insert may hold the conductor elements on its own or in cooperation with other parts, e.g. in cooperation with the supporting body or other parts of the induction sealing device. For example, the conductor elements may be partially or fully encased in the polymer insert. Alternatively, the polymer insert may press the conductor elements against the supporting body or other parts of the induction sealing device.

The supporting body may be configured to hold the polymer insert in various ways. The supporting body may hold the polymer insert on its own or in cooperation with other parts. For example, the polymer insert may be partially or fully encased in the supporting body.

The graphene particles may be dispersed in the polymer matrix of the polymer insert as a filler. The polymer matrix of the polymer insert may additionally comprise other fillers. The graphene particles may be single layer graphene. Alternatively, the graphene particles may be multilayer graphene, wherein multilayer graphene comprises up to 5, up to 10, or up to 20, single graphene layers. Alternatively, the graphene particles may be a mixture of single layer and multilayer graphene.

The polymer insert may comprise magnetic particles dispersed into the polymer matrix of the polymer insert, whereby the polymer insert forms a flux-concentrating insert.

The magnetic particles may comprise ferromagnetic or ferrimagnetic particles. The magnetic particles may comprise at least one of the following materials: ferrite, NiZn ferrite, FeSiAl (sendust), FeSiB alloys (or its derivatives), and FeNi-alloys (or its derivatives).

The flux-concentrating insert may serve to concentrate the magnetic field generated by the inductor and thereby increase the efficiency of the induction sealing device. In order for the flux-concentrating insert to work efficiently it is often arranged in the vicinity of the conductor elements of the inductor, e.g. holding the conductor elements. Thus, a polymer insert that comprises both magnetic particles and graphene may serve the dual purpose of functioning as a flux-concentrating insert and a thermal conductor that cools the inductor.

Alternatively, the polymer insert may be configured to hold a flux-concentrating insert, wherein the flux-concentrating insert comprises a polymer matrix into which magnetic particles are dispersed. Thus, the polymer insert comprising the graphene particles may be different from the flux-concentrating insert. However, while holding the flux-concentrating insert the polymer insert comprising graphene may also conduct heat away from the flux-concentrating insert and/or away from the inductor. Thus, the polymer insert comprising the graphene particles may serve the dual purpose of functioning as a holder for the flux-concentrating insert and a thermal conductor that cools the inductor.

The polymer insert may be configured to have a dielectric strength above a threshold of 100 V/mm. Such a dielectric strength may ensure that the conductor elements do not short circuit, i.e. that electrical current do not travel along an unintended path between two conductor elements. A current path from one conductor element, through the polymer matrix of the polymer insert, to another conductor element could degrade the functionality of the inductor. Such a current path could result in only part of a loop of the inductor being active and generating a magnetic field. Thus, the heat-seal plastic material may not be heated over the intended area, resulting in a short or weak transverse sealing band. It should be understood that what is an acceptable threshold for the dielectric strength of the polymer insert may be different for different embodiments. In some embodiments the polymer insert may e.g. be configured to have a dielectric strength above a threshold of 400 V/mm.

The induction sealing device may be configured to have a concentration of graphene particles in the polymer insert below a threshold of 15%. Such a concentration of graphene particles may ensure that the dielectric strength of the polymer insert is sufficiently high to prevent the conductor elements from short circuiting. Such a concentration of graphene particles may facilitate a simple construction design of the induction sealing device. For example, if the concentration of graphene particles in the polymer insert is below 15% it may be possible to directly encase the inductor in the polymer insert. When the inductor is directly encased in the polymer insert there may be a path between two conductor elements via the polymer insert, wherein the path solely passes through the polymer insert. A concentration of graphene particles in the polymer insert below 15% may ensure that said path does not short circuit. However, it should be understood that if further means for electrical insulation are provided, the polymer insert may comprise more than 15% graphene. For example, if the conductor elements are provided with an electrically insulating coating, e.g. a polymer coating with little or none graphene before being encased in the polymer insert, the polymer insert may comprise more than 15% graphene. The concentration may be measured by weight.

It should be understood that the distance between the conductor elements that should be prevented from short circuiting may affect how much graphene the polymer insert can contain.

Thus, in some cases it may be advantageous to have a concentration of graphene particles in the polymer insert below a threshold of 10%. This may e.g. enable a short distance between the conductor elements. Thus, it may enable the induction sealing device to comprise a double loop inductor, wherein the conductor elements may be closely spaced, encased directly in the polymer insert. In some cases it may even be advantageous to have a concentration of graphene particles in the polymer insert below a threshold of 7.5%. In some cases the distance between the conductor elements may be so long that the polymer insert may comprise more than 15% graphene.

The polymer insert of the induction sealing device may comprise electrically insulating particles dispersed into the polymer matrix of the polymer insert. The inventors have realized that the addition of electrically insulating particles may improve the dielectric strength of the polymer insert. Adding electrically insulating particles to the polymer insert may allow a higher percentage of graphene to be added without resulting in a too low dielectric strength. Thus, a polymer insert comprising both graphene and electrically insulating particles may have a high thermal conductivity and thereby be durable and cost-effective.

The electrically insulating particles may be configured to have a thermal conductivity higher than a thermal conductivity of the polymer matrix. Further, the electrically insulating particles may be configured to have a dielectric strength above a threshold of 1 kV/mm. Thus, the electrically insulating particles may improve the thermal conductivity, and/or the dielectric strength of the polymer matrix as compared to if no electrically insulating particles were dispersed in the polymer matrix. Depending on the application, the threshold for the dielectric strength of the electrically insulating particles may be different. For example, the more graphene polymer matrix of the polymer insert comprises, the higher the threshold for the dielectric strength of the electrically insulating particles may be. Thus, the electrically insulating particles may be configured to have a dielectric strength above a threshold of 10 kV/mm, 20 kV/mm, or 30 kV/mm.

The electrically insulating particles may comprise boron nitride particles. Alternatively, the electrically insulating particles be boron nitride particles. Boron nitride may have a high dielectric strength. Consequently, the dielectric strength of the polymer insert may be high when boron nitride is dispersed in the polymer matrix of the polymer insert, even if the polymer insert also comprises graphene. Further, boron nitride may have a high thermal conductivity, some forms of boron nitride may have a thermal conductivity up to 2000 $Wm^{-1} K^{-1}$. Thus, boron nitride may in itself contribute to the thermal conductivity of the polymer insert, in addition to providing a dielectric strength that enables a higher percentage of graphene. Further, the production defect rate may be low when boron nitride is used, which may save costs. The reason for the low production defect rate may be that the dispersion of boron nitride in the polymer matrix of the polymer insert does not reduce the melt flow rate of the melted polymer matrix substantially.

The induction sealing device may be configured to have a concentration of boron nitride particles in the polymer insert that is below a threshold of 20%. Such a threshold may ensure that the production defect rate for the polymer insert is sufficiently low. The concentration may be measured by weight.

The polymer insert of the induction sealing device may be configured to have a thermal conductivity above a threshold of 0.2 $Wm^{-1} K^{-1}$. Such a thermal conductivity may ensure effective cooling of the inductor. It should be understood that what is considered to be sufficiently effective cooling of the inductor may vary depending on the application. Some types of heat-seal plastic material may require higher temperatures and/or higher currents in the inductor in order to melt, in which case a higher thermal conductivity threshold for the polymer insert may be required. A high repetition frequency for the heat sealing may also require more effective cooling, in which case a higher thermal conductivity threshold for the polymer insert may be required. Thus, in some embodiments the polymer insert of the induction sealing device may be configured to have a thermal conductivity above a threshold of 0.3 $Wm^{-1} K^{-1}$. In other embodiments the polymer insert of the induction sealing device may be configured to have a thermal conductivity above a threshold of 0.4 $Wm^{-1} K^{-1}$. In other embodiments the polymer insert of the induction sealing device may be configured to have a thermal conductivity above a threshold of 0.5 $Wm^{-1} K^{-1}$.

The polymer matrix of the polymer insert of the induction sealing device may be polyphenylene sulfide (PPS). PPS may be particularly compatible with fillers comprising graphene and/or boron nitride. The production defect rate may be low for polymer inserts with a polymer matrix of PPS. PPS may have a higher melt flow rate than alternative polymers. Thus, more graphene and/or boron nitride may be dispersed in PPS before the production defect rate becomes severe.

Alternatively, other polymers may be used as a polymer matrix of the polymer insert. For example, other thermoplastic polymers may be used as a polymer matrix of the polymer insert. For example, polyether ether ketone (PEEK) may be used as a polymer matrix of the polymer insert.

The polymer insert of the induction sealing device may comprise reinforcing fibers. This may be advantageous as it may improve the mechanical properties of the polymer insert and thereby improve the durability. The reinforcing fibers may be e.g. glass fibers.

The induction sealing device may comprise at least one groove separating two conductor elements. The groove may be a groove in the polymer insert. The groove may form a cutting groove. The groove may be arranged between two loops of an inductor. Thus, each loop may form a seal in the packaging material and the groove may allow a cutter, e.g. a blade, to cut the packaging material between the loops. The groove may additionally or alternatively separate two conductor elements and thereby reduce the risk of a short circuit between the conductor elements. Thereby, more graphene may be dispersed in the polymer insert or in parts of the polymer insert such that the thermal conductivity increases without an increased risk of short circuits.

The supporting body of the induction sealing device may be made of metal. This may further improve the cooling of the inductor. Heat may be conducted from the conductor elements of the inductor, via the polymer insert holding the conductor elements, to the supporting body holding the polymer insert. Metal may herein be regarded as a good thermal conductor which may remove the heat further.

The polymer insert of the induction sealing device may be configured such that the polymer matrix with dispersed particles has a melt flow rate above a threshold of 40, when the polymer matrix is in a melted form. A melt flow rate above a threshold of 40 may enable the polymer insert being produced by injection moulding. This may be a cost-effective production method. The required threshold may vary between applications. For example, if the polymer insert comprise small features, a higher threshold for the melt flow rate may be advantageous to ensure that the polymer matrix in the melted form fills the mould completely. Thus, as an alternative to a threshold of 40 the threshold may be e.g. 50. The melt flow rate may be a melt flow rate as measured according to a standard, e.g. ISO 1133. The melt flow rate may be measured at a temperature of 316° C. with the melted polymer matrix being subjected to a weight of 5 kg.

BRIEF DESCRIPTION OF THE DRAWINGS

The above, as well as additional objects, features and advantages of the present inventive concept, will be better understood through the following illustrative and non-limiting detailed description, with reference to the appended drawings. In the drawings like reference numerals will be used for like elements unless stated otherwise.

DETAILED DESCRIPTION

In the following a number of induction sealing devices 15 for heat sealing packaging material for producing sealed packages of pourable food products will be described. The induction sealing devices 15 may be configured to press against the packaging material in a direction A. During the sealing of the packaging material, the packaging material may be pressed on opposite sides by the induction sealing devices 15 and an anvil.

Figure 1A:
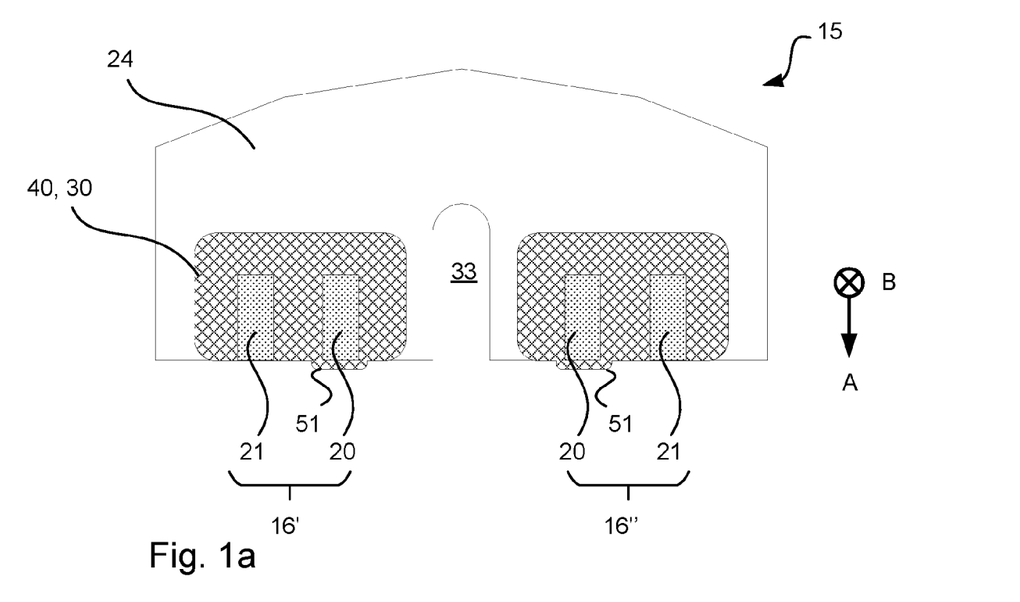
FIG. 1a shows a cross-section of an induction sealing device.

FIG. 1a illustrates an induction sealing device 15 in cross-sectional view, wherein direction B is normal to the cross-sectional plane. In the induction sealing device 15, the polymer insert 40 holds the conductor elements 20, 21 of an inductor 16 while the supporting body 24 holds the polymer insert 40. The polymer insert 40 comprises a polymer matrix. In FIG. 1a the polymer insert 40 comprise magnetic particles dispersed into the polymer matrix of the polymer insert 40, whereby the polymer insert 40 forms a flux-concentrating insert 30.

Figure 1B:
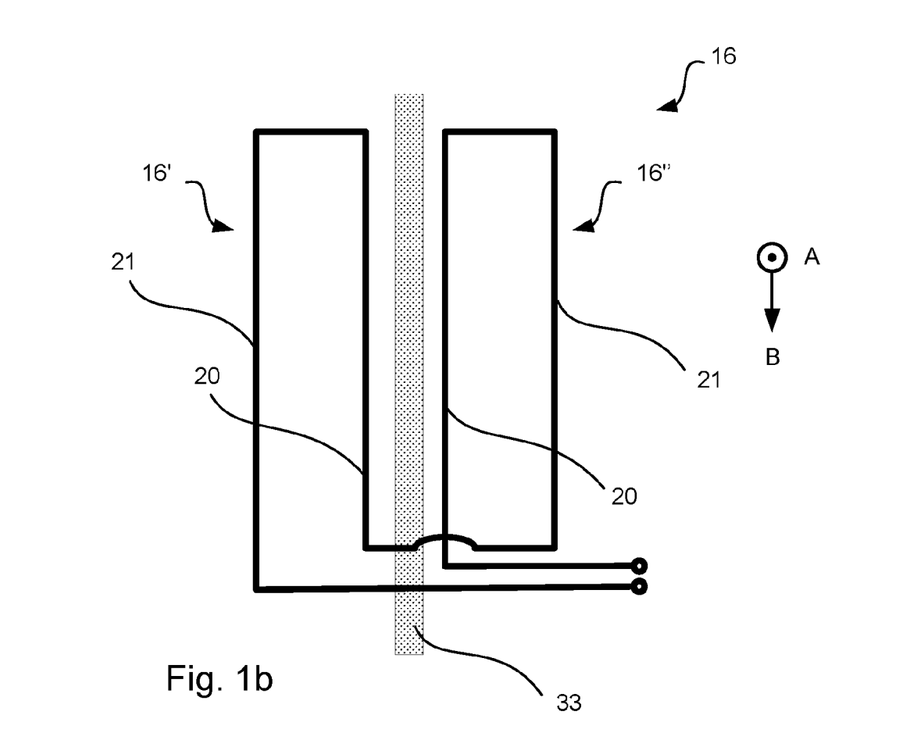
FIG. 1b shows a schematic electric diagram of an inductor of an induction sealing device.

FIG. 1b illustrates a schematic electric diagram of the inductor 16 in FIG. 1a, as viewed in a direction A orthogonal to direction B. The illustrated inductor 16 comprises conductor elements 20, 21 in the form of electrically conductive bars. Two conductor elements 20, 21 may form parts of an inductor loop. FIG. 1b illustrates a double loop inductor 16 comprising a first inductor loop 16' and a second inductor loop 16". An induction sealing device 15 may of course comprise any number of inductor loops. The inductor 16 may be connected to an alternating current generator, e.g. a high-frequency current generator (not shown in the Figures).

Figure 2A:
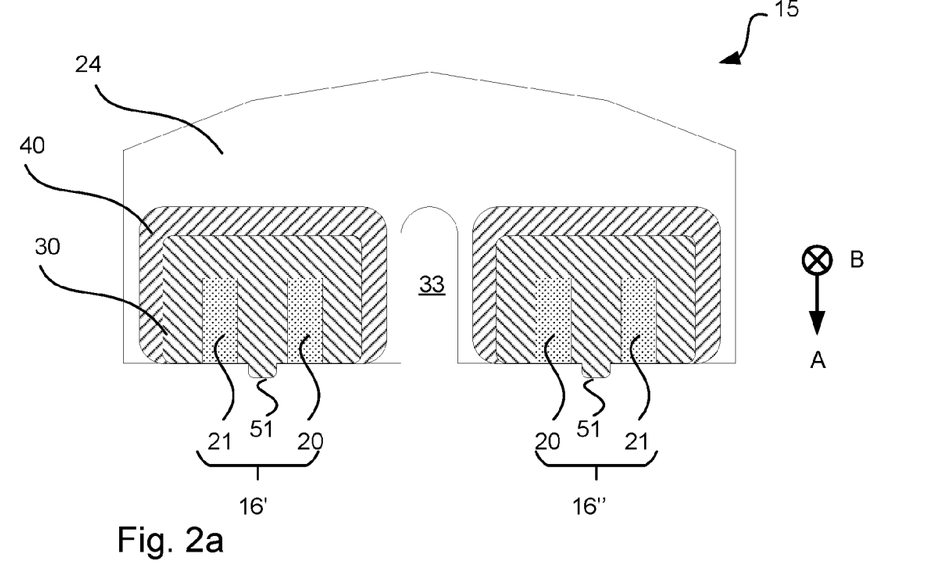
FIG. 2a-b show cross-sections of induction sealing devices.
Figure 2B:
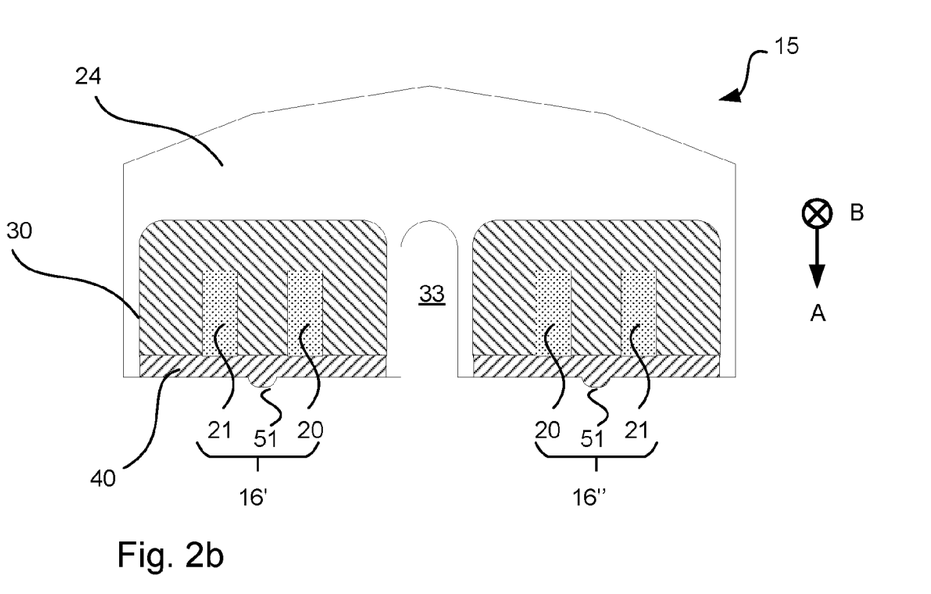

In FIG. 1a the polymer insert 40 is a flux-concentrating insert 30. As an alternative, the polymer insert 40 may hold a flux-concentrating insert 30, as illustrated in FIGS. 2a and 2b. Thus, as illustrated in FIGS. 2a and 2b, one polymer matrix comprising magnetic particles may form a flux-concentrating insert 30 while a separate polymer insert 40, comprising a polymer matrix and e.g. graphene and/or boron nitride, conducts heat away from the inductor 16. Alternatively, the polymer matrix may, as illustrated in FIG. 1a, comprise both magnetic particles and heat conducting particles such as e.g. graphene and/or boron nitride.

In FIG. 1a the polymer insert 40 holds the conductor elements 20, 21 by partially encasing the conductor elements 20, 21, herein encasing the conductor elements 20, 21 on three sides. As an alternative the polymer insert 40 may hold the conductor elements 20, 21 by holding another part of the induction sealing device 15 which in turn holds the conductor elements 20, 21. FIG. 2a illustrates a polymer insert 40 holding another part of the induction sealing device 15, in this case a flux-concentrating insert 30, which in turn holds the conductor elements 20, 21. As a further alternative the polymer insert 40 may hold the conductor elements 20, 21 by pressing the conductor elements 20, 21 against the supporting body 24 or another part of the induction sealing device 15. FIG. 2b illustrates a polymer insert 40 holding the conductor elements 20, 21 by pressing the conductor elements 20, 21 against another part of the induction sealing device 15, in this case a flux-concentrating insert 30.

There are many conceivable design options for an induction sealing device 15. A few design options, in addition to the ones shown in FIG. 1a and FIG. 2a-b, are shown in FIG. 3a-d. The induction sealing device 15 may be configured to bring the inductor 16 and/or the flux-concentrating insert 30 in close proximity to the packaging material. For example, the induction sealing device 15 may be configured to be pressed against the packaging material in direction A illustrated in the Figures.

A surface of the induction sealing device 15 configured to press against the packaging material may be fitted with one or more ridges 51 configured to supply a localized pressure to the packaging material. A ridge 51 may be formed by a flux-concentrating insert 30, e.g. as in FIG. 1a, by the polymer insert 40, e.g. as in FIG. 2b, or by a conductor element 20, 21, e.g. as in FIG. 3b. A ridge 51 may be arranged at a conductor element 20, 21, e.g. as in FIG. 1a or FIG. 3b, or in between two conductor elements 20, 21, e.g. as in FIG. 2a. Alternatively, the induction sealing device 15 may lack ridges 51, as shown in FIGS. 3a, 3c and 3d.

Figure 3A:
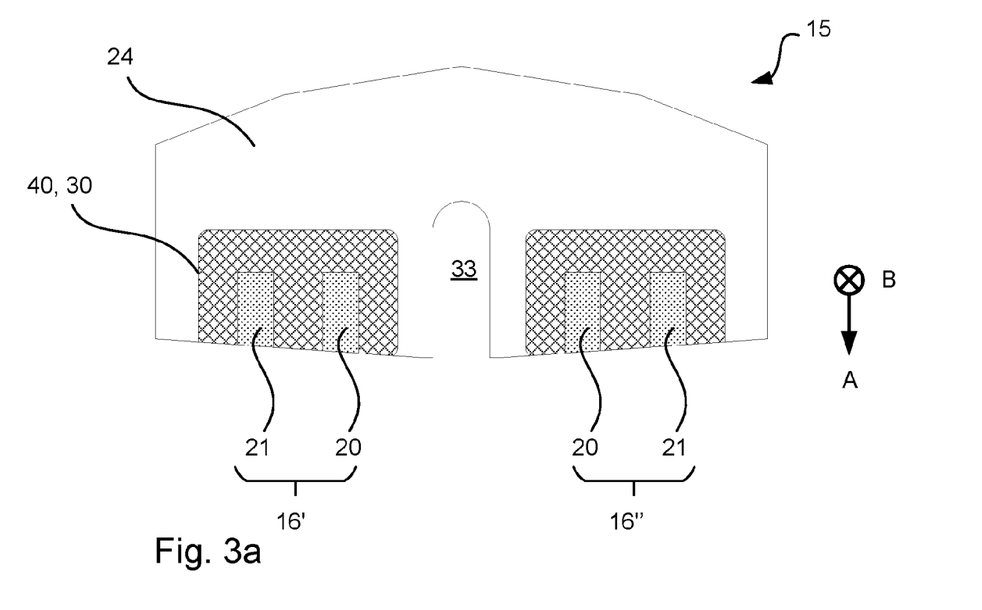
FIG. 3a-d show cross-sections of induction sealing devices.
Figure 3B:
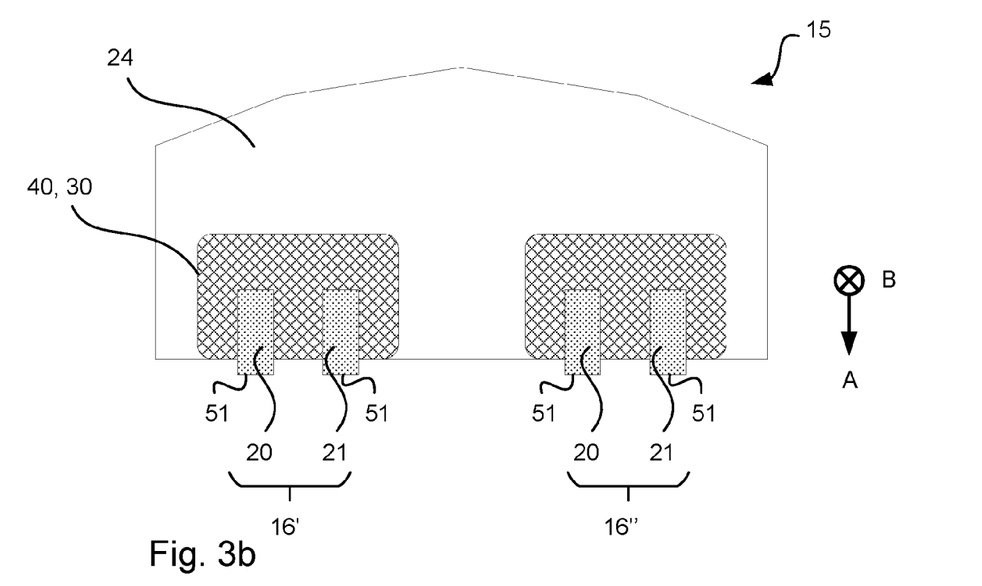

A surface of the induction sealing device 15 configured to press against the packaging material may be inclined, as illustrated in FIG. 3a. Thus, the induction sealing device 15 may be configured to press the pourable food product away from a central region of the induction sealing device 15. Thereby, the risk of the pourable food product degrading the seal may be reduced.

Figure 3C:
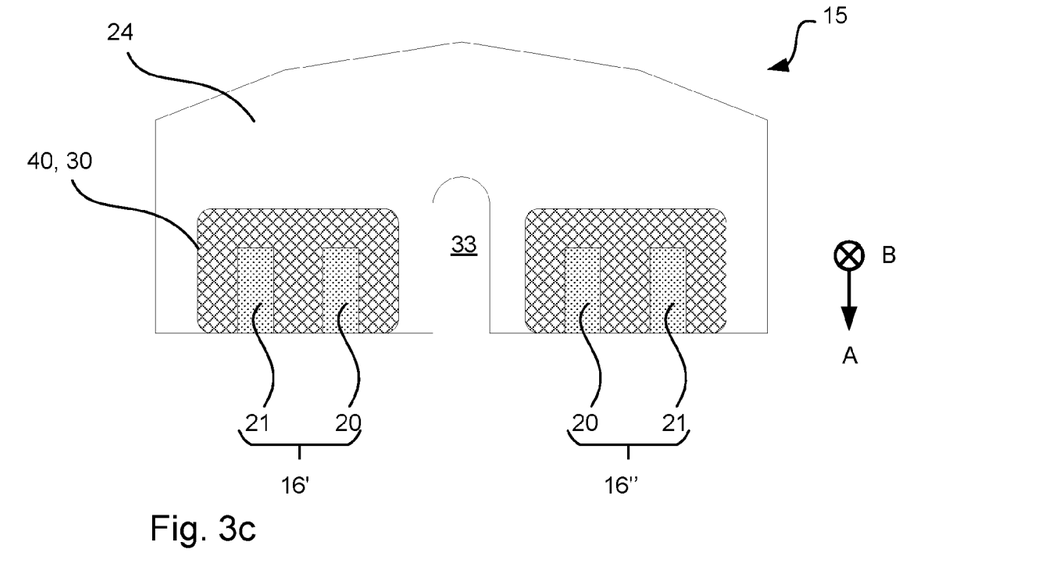
Figure 3D:
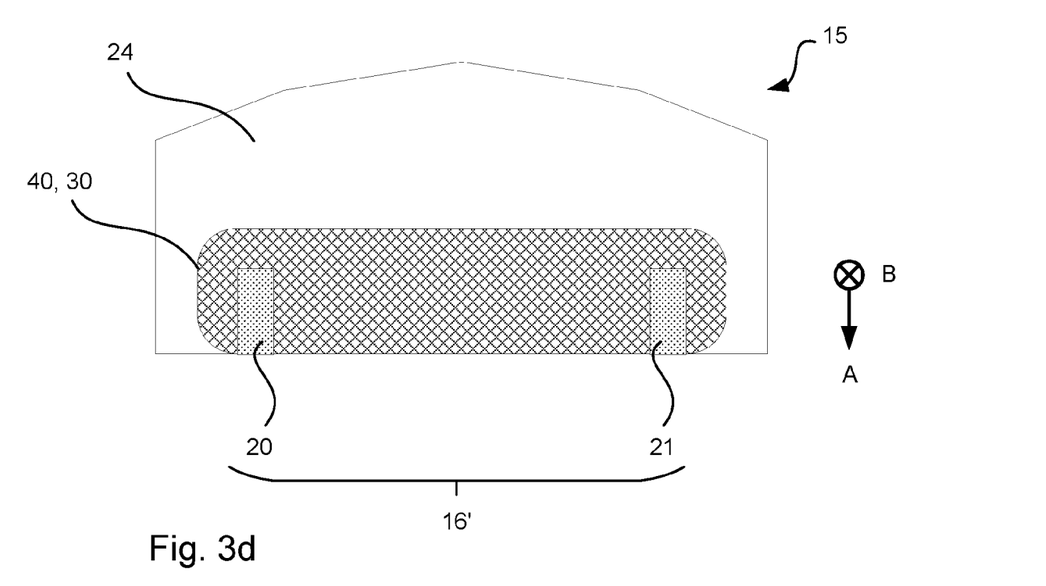

The inductor 16 of the induction sealing device 15 may comprise a first induction loop 16' and a second induction loop 16", as illustrated in e.g. FIG. 1a and FIG. 3c. Alternatively, the inductor 16 of the induction sealing device 15 may comprise solely a first induction loop 16', as illustrated in FIG. 3d.

The induction sealing device 15 may comprise a groove 33. The groove 33 may form a cutting groove. The groove may be arranged between two inductor loops 16' and 16", e.g. as illustrated in FIG. 1a. Thus, each inductor loop may form a seal in the packaging material and the groove 33 may allow a cutter, e.g. a blade, to cut the packaging material between the loops. The groove 33 may additionally or alternatively separate two conductor elements 20, 21 and thereby reduce the risk of a short circuit between the conductor elements 20, 21.

The supporting body 24, e.g. in any of the devices illustrated in FIG. 1-3, may be made of metal. Alternatively, the supporting body 24 may be made of a ceramic. Alternatively, the supporting body 24 may be made of a polymer with a heat conducting filler, e.g. graphene.

The induction sealing device 15 may comprise a cooling system, e.g. a cooling system circulating cooling liquid. The cooling system may be connected to the supporting body of the induction sealing device 15.

The polymer matrix of the polymer insert 40, e.g. in any of the devices illustrated in FIG. 1-3, may be polyphenylene sulfide (PPS). The polymer matrix of the flux-concentrating insert 30, e.g. in any of the devices illustrated in FIG. 1-3, may be PPS. Other polymer matrices may alternatively be used for either of the polymer insert 40 or the flux-concentrating insert 30. For example, other thermoplastic polymers may be used as a polymer matrix. For example, polyether ether ketone (PEEK) may be used as a polymer matrix.

Thermally conductive particles may be dispersed in the polymer matrix of the polymer insert 40, e.g. in the polymer insert 40 of any of the devices illustrated in FIG. 1-3. The thermally conductive particles may be graphene and/or boron nitride. For example, the polymer insert 40 may comprise a PPS polymer matrix into which graphene and/or boron nitride is dispersed.

The graphene particles may have a thickness of one monolayer. The graphene particles may have a thickness larger than one monolayer. The thickness of the graphene particles may be represented by a thickness distribution, e.g. 10-100% of the particles having monolayer thickness. The lateral size of the graphene particles may be e.g. 0.1-10 μm or 0.0001-2 mm. The graphene particles may be produced by e.g. liquid phase exfoliation of graphite, oxidation of graphite with subsequent exfoliation and/or reduction, or chemical vapor deposition.

The boron nitride particles may be of the hexagonal, cubic or wurtzite form. The boron nitride particles may have a platelet shape. Other shapes of the boron nitride particles may alternatively be used, e.g. granules, granules of platelets, agglomerates or agglomerates of platelets. The size of the boron nitride particles may be e.g. 0.1-10 μm or 0.0001-2 mm.

As fillers are dispersed in the polymer matrix of the polymer insert 40 properties of the polymer matrix may change. Examples of properties that may change are: the thermal conductivity, the dielectric strength, and the melt flow rate. In the following the above properties of PPS will be discussed as a function of filler concentration for the two fillers graphene and boron nitride. Filler concentrations of 0%, 5%, 7.5%, and 10% were measured. The concentrations were measured by weight.

Figure 4:
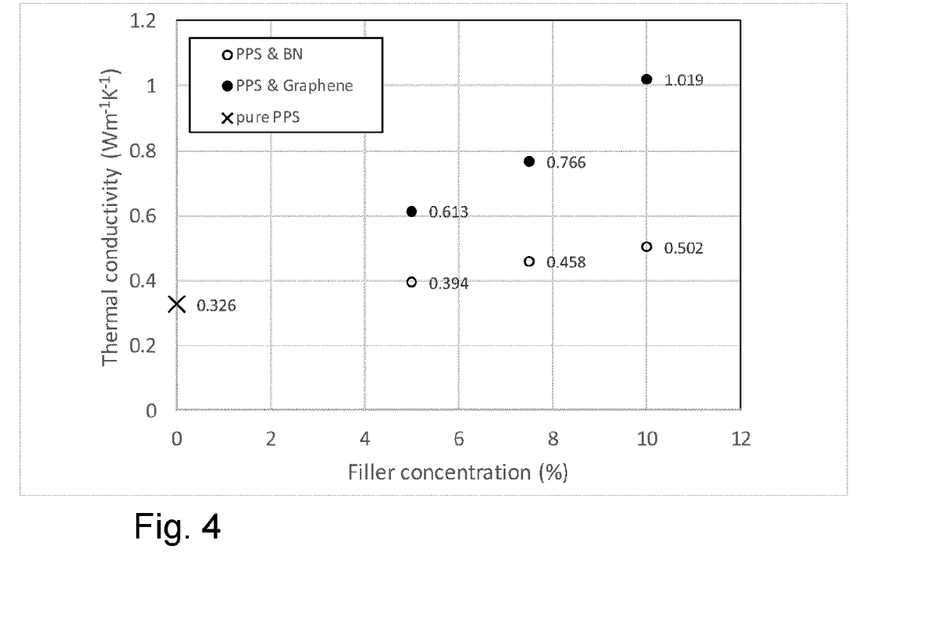
FIG. 4 shows measured thermal conductivities.

FIG. 4 shows measured thermal conductivities for PPS as a function of filler concentration for graphene and boron nitride. As can be seen in the Figure, the thermal conductivity increases with filler concentration for both graphene and boron nitride. Pure PPS displayed a thermal conductivity of 0.326 Wm$^{-1}$ K$^{-1}$. PPS with 10% graphene displayed a thermal conductivity of 1.019 Wm$^{-1}$ K$^{-1}$, roughly a 210% increase. PPS with 10% boron nitride displayed a thermal conductivity of 0.502 Wm$^{-1}$ K$^{-1}$, roughly a 50% increase. Further increases in thermal conductivity may be expected at higher filler concentrations. Further measured thermal conductivities may be found in Table 1.

TABLE 1

| Polymer insert | Thermal conductivity (W/(mK)) | Polymer insert | Thermal conductivity (W/(mK)) |
| --- | --- | --- | --- |
| Pure PPS | 0.362 | | |
| PPS + 5% BN | 0.394 | polymer + ferrite | 1.143 |
| PPS + 7.5% BN | 0.458 | polymer + ferrite + 20% BN | 2.079 |
| PPS + 10% BN | 0.502 | polymer + ferrite + 7.5% graphene | 2.114 |
| PPS + 20% BN | 0.651 | polymer + ferrite + 7.5% graphene + 7.5% BN | 3.049 |
| PPS + 5% graphene | 0.613 | | |
| PPS + 7.5% graphene | 0.766 | | |
| PPS + 10% graphene | 1.019 | | |

Figure 5:
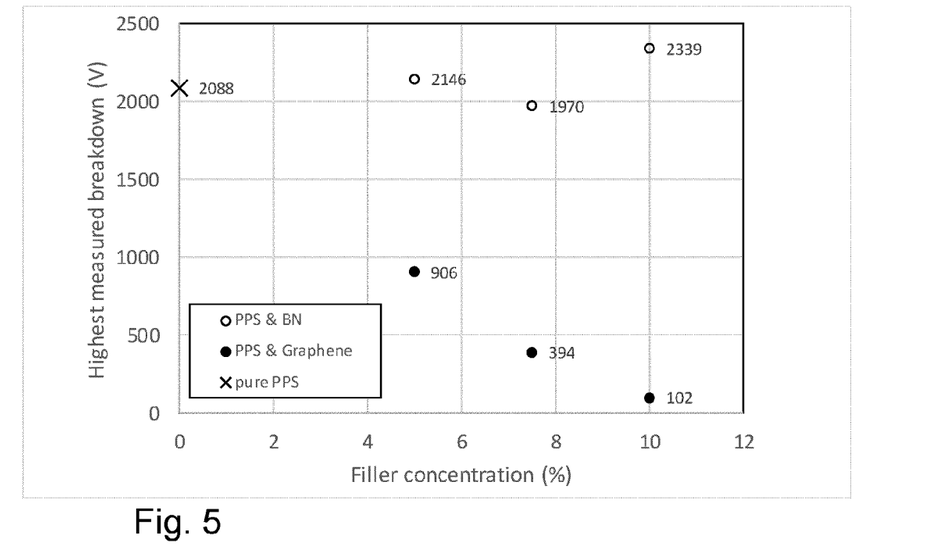
FIG. 5 shows measured breakdown voltages.

FIG. 5 shows the highest measured breakdown voltages for PPS as a function of filler concentration for graphene and boron nitride measured across a 0.5 mm thick sample. The dielectric strength may be the breakdown voltage divided by the sample thickness. It should be noted that some samples displayed lower breakdown voltages than the ones presented. However, achieving the highest possible breakdown voltage at a given filler concentration may be a matter of optimization of the manufacturing process. Consequently, it is the highest measured breakdown voltages that are of interest. As can be seen in the Figure, the breakdown voltage may increase with increasing boron nitride concentration. Further, the breakdown voltage may decrease with increasing graphene concentration. Pure PPS displayed a breakdown voltage of 2088 V, which may correspond to a dielectric strength of 4176 V/mm. PPS with 10% graphene displayed a highest breakdown voltage of 102 V, which may correspond to a dielectric strength of 204 V/mm. PPS with 10% boron nitride displayed a highest breakdown voltage of 2339 V, which may correspond to a dielectric strength of 4678 V/mm. However, it should be noted that the dielectric strength of pure PPS may, according to the material specification, be in the range of 11-24 kV/mm. Thus, the measurements may possibly underestimate the actual dielectric strength by a factor between 3 and 6.

Figure 6:
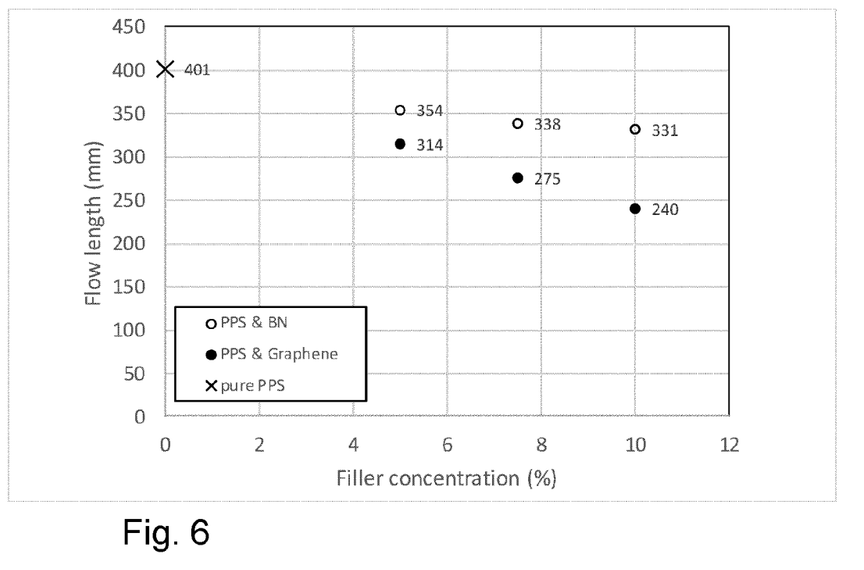
FIG. 6 shows measured flow lengths.

FIG. 6 shows measured flow lengths from a snake flow test for PPS as a function of filler concentration for graphene and boron nitride. The flow length was measured by injection moulding the melted polymer matrix with dispersed fillers into a mould with a snake-like configuration. The injection moulding was performed with a melt temperature of approximately 335° C., an injection pressure of 150 MPa, and an injection speed of 40 ccm/s. As can be seen in the Figure, the flow length was observed to decrease with filler concentration for both graphene and boron nitride. All measured flow lengths correspond to melt flow rates above 40.

Based on the studies presented in FIG. 4-6 it is estimated that the polymer insert 40 may have one of the following configurations:

The polymer insert 40 of at least some of the devices of FIGS. 1-3, e.g. the device of FIG. 2a or 2b, may be made of PPS into which 15% graphene has been dispersed.

The polymer insert 40 of at least some of the devices of FIGS. 1-3, e.g. the device of FIG. 2a or 2b, may be made of PPS into which 30% boron nitride has been dispersed.

The polymer insert 40 of at least some of the devices of FIGS. 1-3, e.g. the device of FIG. 1a or 3a, may be made of PPS into which 15% graphene and 60% ferrite has been dispersed, such that the polymer insert 40 forms a flux-concentrating insert 30.

The polymer insert 40 of at least some of the devices of FIGS. 1-3, e.g. the device of FIG. 1a or 3a, may be made of PPS into which 20% boron nitride and 60% ferrite has been dispersed, such that the polymer insert 40 forms a flux-concentrating insert 30.

The polymer insert 40 of at least some of the devices of FIGS. 1-3, e.g. the device of FIG. 1a or 3a, may be made of PPS into which 10% graphene, 10% boron nitride, and 60% ferrite has been dispersed, such that the polymer insert 40 forms a flux-concentrating insert 30.

The polymer insert 40 of at least some of the devices of FIGS. 1-3, e.g. the device of FIG. 1a or 3a, may be made of PPS into which 20% graphene, 20% boron nitride, and 50% ferrite has been dispersed, such that the polymer insert 40 forms a flux-concentrating insert 30.

The polymer insert 40 of at least some of the devices of FIGS. 1-3, e.g. the device of FIG. 1a or 3a, may be made of PPS into which 5% graphene, 5% boron nitride, and 80% ferrite has been dispersed, such that the polymer insert 40 forms a flux-concentrating insert 30.

In the above the inventive concept has mainly been described with reference to a limited number of examples. However, as is readily appreciated by a person skilled in the art, other examples than the ones disclosed above are equally possible within the scope of the inventive concept, as defined by the appended claims.

The invention claimed is:

1. An induction sealing device for heat sealing packaging material for producing sealed packages of pourable food products, said sealing device comprising:
   an inductor configured to induce a current in the packaging material, the inductor comprising conductor elements;
   a polymer insert holding said conductor elements; and
   a supporting body holding said polymer insert;
   wherein the polymer insert comprises a polymer matrix into which graphene particles are dispersed; and
   wherein the polymer insert comprises magnetic particles dispersed into the polymer matrix of the polymer insert, whereby the polymer insert forms a flux-concentrating insert.

2. The induction sealing device of claim 1, wherein a concentration of graphene particles in the polymer insert is below a threshold of 15%.

3. The induction sealing device of claim 1, wherein the polymer insert further comprises electrically insulating particles dispersed into the polymer matrix of the polymer insert.

4. The induction sealing device of claim 3, wherein the electrically insulating particles comprise boron nitride particles.

5. The induction sealing device of claim 4, wherein a concentration of boron nitride particles in the polymer insert is below a threshold of 20%.

6. The induction sealing device of claim 1, wherein the polymer insert is configured to have a thermal conductivity above a threshold of 0.2 W/(mK).

7. The induction sealing device of claim 1, wherein the polymer matrix of the polymer insert is polyphenylene sulfide.

8. The induction sealing device of claim 1, wherein the polymer insert comprises reinforcing fibers.

9. The induction sealing device of claim 1, further comprising at least one groove separating two conductor elements.

10. The induction sealing device of claim 1, wherein the supporting body is made of metal.

11. The induction sealing device of claim 1, wherein the polymer insert is configured such that the polymer matrix with dispersed particles has a melt flow rate, measured in g/10 min, above a threshold of 40, when the polymer matrix is in a melted form.

12. An induction sealing device for heat sealing packaging material for producing sealed packages of pourable food products, said sealing device comprising:
   an inductor configured to induce a current in the packaging material, the inductor comprising conductor elements;
   a polymer insert holding said conductor elements; and
   a supporting body holding said polymer insert;
   wherein the polymer insert comprises a polymer matrix into which graphene particles are dispersed; and wherein the polymer insert is configured to hold a flux-concentrating insert, wherein the flux-concentrating insert comprises a polymer matrix into which magnetic particles are dispersed.

13. The induction sealing device of claim 12, wherein a concentration of graphene particles in the polymer insert is below a threshold of 15%.

14. The induction sealing device of claim 12, wherein the polymer insert further comprises electrically insulating particles dispersed into the polymer matrix of the polymer insert.

15. The induction sealing device of claim 14, wherein the electrically insulating particles comprise boron nitride particles.

16. The induction sealing device of claim 15, wherein a concentration of boron nitride particles in the polymer insert is below a threshold of 20%.

17. The induction sealing device of claim 12, wherein the polymer insert is configured to have a thermal conductivity above a threshold of 0.2 W/(mK).

18. The induction sealing device of claim 12, wherein the polymer matrix of the polymer insert is polyphenylene sulfide.

19. The induction sealing device of claim 12, wherein the polymer insert comprises reinforcing fibers.

20. The induction sealing device of claim 12, further comprising at least one groove separating two conductor elements.

21. The induction sealing device of claim 12, wherein the supporting body is made of metal.

22. The induction sealing device of claim 12, wherein the polymer insert is configured such that the polymer matrix with dispersed particles has a melt flow rate, measured in g/10 min, above a threshold of 40, when the polymer matrix is in a melted form.

* * * * *